United States Patent Office.

FRANK C. TEGETTHOFF, OF CLEVELAND, OHIO.

Letters Patent No. 100,688, dated March 8, 1870.

---

IMPROVED ROOFING COMPOUND.

---

The Schedule referred to in these Letters Patent and making part of the same

---

*To all whom it may concern:*

I, FRANK C. TEGETTHOFF, of Cleveland, county of Cuyahoga, and State of Ohio, have invented a certain Compound for Roofing Purposes, of which the following is a specification.

The nature of my invention consists in mixing the following-named ingredients in about the proportion stated, thus making a composition for roofing that is not liable to crack, and that is sufficiently elastic to allow of the expansion and contraction.

To prepare this composition, I first take one bushel of water-lime and add to it two pounds pulverized resin, mixing them well together. I then add this to seven bushels clear, sharp sand, thoroughly working them together, and then add half a bushel of air-slaked lime, still stirring all well together.

Next I take coal-tar and add to it in the proportion of two gallons of linseed oil to forty of tar, and having the tar hot, I add a sufficient quantity of it to the aforesaid mixture of sand, limes, and resin to give it the consistency of mortar.

This composition is applied while hot to a roof covered with a sheathing of felt, laid in the ordinary manner.

I claim the preparation of the roofing compound herein described, of the ingredients in the proportions and for the purpose set forth.

FRANK C. TEGETTHOFF.

Witnesses:
GEO. W. TIBBITTS,
C. W. QUIRK.